(12) United States Patent
Nezu

(10) Patent No.: US 9,611,964 B2
(45) Date of Patent: Apr. 4, 2017

(54) CONNECTOR

(71) Applicant: NIFCO INC., Yokosuka-shi, Kanagawa (JP)

(72) Inventor: Mikio Nezu, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 101 days.

(21) Appl. No.: 14/430,435

(22) PCT Filed: Sep. 26, 2013

(86) PCT No.: PCT/JP2013/005730
§ 371 (c)(1),
(2) Date: Mar. 23, 2015

(87) PCT Pub. No.: WO2014/050119
PCT Pub. Date: Apr. 3, 2014

(65) Prior Publication Data
US 2015/0233510 A1 Aug. 20, 2015

(30) Foreign Application Priority Data
Sep. 26, 2012 (JP) .................. 2012-212551

(51) Int. Cl.
*F16L 37/00* (2006.01)
*F16L 37/088* (2006.01)

(52) U.S. Cl.
CPC .................. *F16L 37/088* (2013.01)

(58) Field of Classification Search
USPC ............... 285/305, 321, 80, 81, 319
See application file for complete search history.

(56) References Cited

U.S. PATENT DOCUMENTS 2,021,241 A * 11/1935 Mall ................ F16B 21/16
15/410
3,753,582 A * 8/1973 Graham ............ F16L 37/088
24/573.11
(Continued)

FOREIGN PATENT DOCUMENTS

CH 448644 A 12/1967
CN 101876387 A 11/2010
(Continued)

OTHER PUBLICATIONS

China Patent Office, "Office Action for CN 201380050214.3 ," Oct. 10, 2015.
PCT, "International Search Report for PCT/JP2013/005730".

*Primary Examiner* — Aaron Dunwoody
(74) *Attorney, Agent, or Firm* — Manabu Kanesaka

(57) ABSTRACT

A connector includes a male member mounted on a connector housing, and a lock member which can engage and disengage between the connector housing and the male member. The connector housing includes a lock-member guide wall guiding the lock member; an engagement projection engaging with one portion of the lock member, and restricting the lock member from descending; a sliding surface where a tip portion slides accompanied by a movement of the lock member; and a through-hole through which one portion of the lock member held by the lock-member guide wall passes, and which is formed to engage with an engagement portion formed on an outer periphery of the male member mounted on the connector housing. In the lock member, the movement is restricted by the engagement projection, and after an engagement with the engagement projection is released, the lock member descends to prevent an unprepared release and ensure safety.

13 Claims, 16 Drawing Sheets

(56) References Cited

U.S. PATENT DOCUMENTS

| | | | | |
|---|---|---|---|---|
| 6,554,322 | B2* | 4/2003 | Duong | F24H 9/2035 285/201 |
| 7,516,989 | B2* | 4/2009 | Yoshida | B29C 65/08 285/321 |
| 7,950,699 | B2* | 5/2011 | Bauer | F16L 37/088 285/305 |
| 8,336,919 | B2 | 12/2012 | Hutchinson | |
| 8,973,952 | B2* | 3/2015 | Nishino | F16L 37/1225 285/305 |
| 2003/0052484 | A1* | 3/2003 | Rautureau | F16L 37/144 285/305 |
| 2004/0051313 | A1* | 3/2004 | Trouyet | F16L 37/088 285/305 |
| 2006/0202476 | A1* | 9/2006 | Eggert | F16L 37/088 285/305 |
| 2007/0059972 | A1 | 3/2007 | Rigollet et al. | |
| 2012/0104746 | A1* | 5/2012 | Fansler | F16L 37/088 285/239 |
| 2013/0140808 | A1* | 6/2013 | Bongiorni | F16L 21/08 285/81 |
| 2015/0167879 | A1* | 6/2015 | Chaupin | F16L 37/084 285/321 |
| 2015/0176738 | A1* | 6/2015 | Nezu | F16L 37/088 285/321 |

FOREIGN PATENT DOCUMENTS

| | | |
|---|---|---|
| EP | 2402640 A1 | 1/2012 |
| EP | 2174053 B1 | 4/2012 |
| JP | 2001-289381 A | 10/2001 |
| JP | 2004-211891 A | 7/2004 |
| JP | 2006-266472 A | 10/2006 |

\* cited by examiner

CONNECTOR

RELATED APPLICATIONS

The present application is National Phase of International Application No. PCT/JP2013/005730 filed Sep. 26, 2013, and claims priority from Japanese Application No. 2012-212551, filed Sep. 26, 2012, the disclosure of which is hereby incorporated by reference herein in its entirety.

FIELD OF TECHNOLOGY

The present invention relates to a connector used for a connection of a fluid pipe, and relates to a connector which can quickly and reliably carry out a connection of a pipe for automobiles.

BACKGROUND ART

A connector generally has a structure such that a connector housing and a pipe body (a male member) can be engaged and released by operating a wire retainer (a lock member). For example, as shown in Patent Document 1, the connector is formed by the connector housing and the wire retainer (the lock member). Also, there is provided an engagement slit (a through-hole) in a retainer attachment portion of the connector housing, and one portion of the wire retainer enters into the engagement slit, and projects into the retainer attachment portion. In that state, when the pipe body (the male member) is inserted, the wire retainer engages an outer peripheral groove of the pipe body to be locked. At a time of a release, the wire retainer is pulled upwardly (Patent Document 1).

Also, in order to solve the aforementioned disadvantages, there is proposed a connector which can perform a mounting/dismounting operation with one touch.

PRIOR ART DOCUMENT

Patent Document

Patent Document 1: Japanese Unexamined Patent Application Publication No. 2006-266472

SUMMARY OF THE INVENTION

Problems to be Solved by the Invention

In a case of the conventional Patent Document 1, however, the connector has the structure of releasing the wire retainer (the lock member) by operating the wire retainer (the lock member) to pull upwardly, so that a projecting portion (an operation stroke) of the wire retainer is large, and in a narrow space, a work is difficult. Also, it is necessary to have an interval between the wire retainer and an adjacent part so that it is not to be suitable for an engine room of an automobile and the like where a close arrangement is required.

Moreover, in a case of the connector which can perform a release operation with one touch, the release operation can be easily carried out. On the other hand, a lock can be released by an erroneous operation to cause a risk such that boiling water and the like may scatter. Also, while operating the lock member with one hand, carrying out an operation for pulling out a hose having a large hole diameter and weight with the other hand is difficult so as to have poor workability.

The present invention is made in order to solve the aforementioned inconveniences, and an object thereof is to provide a connector wherein the release operation can be easily operated, and a portion protruding outward is minimized, and which is difficult to be unexpectedly released accidentally.

Means for Solving the Problems

According to the present invention, such an object can be obtained by providing a connector including a cylindrical connector housing in which through-holes extending in a circumferential direction are provided on the right and left; a cylindrical male member including an opposing end to be entered into an opposing end of the connector housing, and circumferential grooves conforming with the through-holes in a state wherein the opposing end of the connector housing is entered; and an elastic lock member including an intermediate portion, and both right-and-left leg portions extending to the right and left from the intermediate portion to be received into the through-holes. On an outer periphery of the connector housing, there are provided sliding inclined surfaces to be engaged with loose ends of both leg portions of the lock member, and the lock member can take an engagement position where the loose ends of both leg portions are positioned in proximal positions of the sliding inclined surfaces, and both leg portions enter into the circumferential grooves inward from the through-holes; and a release position where the loose ends of both leg portions are positioned in distal positions of the sliding inclined surfaces, and respectively spread to open both leg portions against an elastic force of the lock member, and both leg portions escape into the through holes from the circumferential grooves. Also, on the outer periphery of the connector housing, there is provided a locking wall to stand, and an engagement projection protrudes laterally from the locking wall. Also, outside a radial direction of the engagement projection, there is provided a locking portion to lock the lock member which is located in the aforementioned position.

Effect of the Invention

According to the present invention, when the lock member is located in the engagement position, the lock member is held in the engagement position by the locking portion so as to prevent an unprepared erroneous release operation. Also, it is not necessary to protrude the locking portion largely from the connector housing so as to minimize a portion protruding outward. Moreover, for example, if the engagement projection is projected in an axial direction, the locking state of the lock member can be cancelled by a simple operation such that the lock member is displaced in the axial direction and the like, and directly, the intermediate portion of the lock member is pushed in, so that the lock member can be displaced from the engagement position to the release position so as to allow a so-called one-touch operation.

According to a preferred embodiment of the present invention, on the outer periphery of the connector housing, there are provided lock-member guide walls controlling an axial direction displacement of the lock member in such a way as to extend in the circumferential direction, and the locking wall is integrally provided with the lock-member guide walls. For example, the lock-member guide walls are provided in front and back in the axial direction so as to form the holding groove holding the lock member between the lock-member guide walls. Especially, in a case wherein the lock member is displaced in the axial direction so as to allow the locking state of the lock member to be cancelled, it is preferable to set a width of the holding groove to allow such an axial direction displacement of the lock member.

The locking wall can be independently provided; however, it is preferable to form an axial-directional extension portion of the lock-member guide wall. Also, the lock member can be held in the release position so as to improve user-friendliness, so that it is preferable to provide a holding portion holding the release state of the lock member in the locking wall. For example, the holding portion can include an undercut concave portion provided inside the radial direction more than the engagement projection of the locking wall.

Also, preferably, the intermediate portion of the lock member includes a portion bent in such a way as to protrude in the axial direction, and the lock-member guide wall includes a hollow portion to receive the bent portion. Also, preferably, there is included the axial-directional extension portion to externally surround the bent portion from a right-and-left direction, and especially, the lock member is formed by a metal wire rod having elasticity.

BEST MODES OF CARRYING OUT THE INVENTION

A connector of the present invention comprises a connector housing; a male member mounted on the connector housing; and a lock member. The connector housing includes a lock-member guide wall guiding the lock member; an engagement projection engaging with one portion of the lock member, and restricting the lock member from descending; a sliding surface where a tip portion slides accompanied by a movement of the lock member; and a through-hole through which one portion of the lock member held by the lock-member guide wall passes, and which is formed to engage with an engagement portion formed on an outer periphery of the male member mounted on the connector housing. The lock member engages with the engagement portion formed on the outer periphery of the male member by an elastic force in an unloaded state, and the movement is restricted by the engagement projection. After an engagement with the engagement projection is released, the lock member descends by applying a load, and is removed from the engagement portion formed on the outer periphery of the male member so as to prevent an unprepared erroneous release operation and eliminate a projecting portion.

First Embodiment

Figure 1:
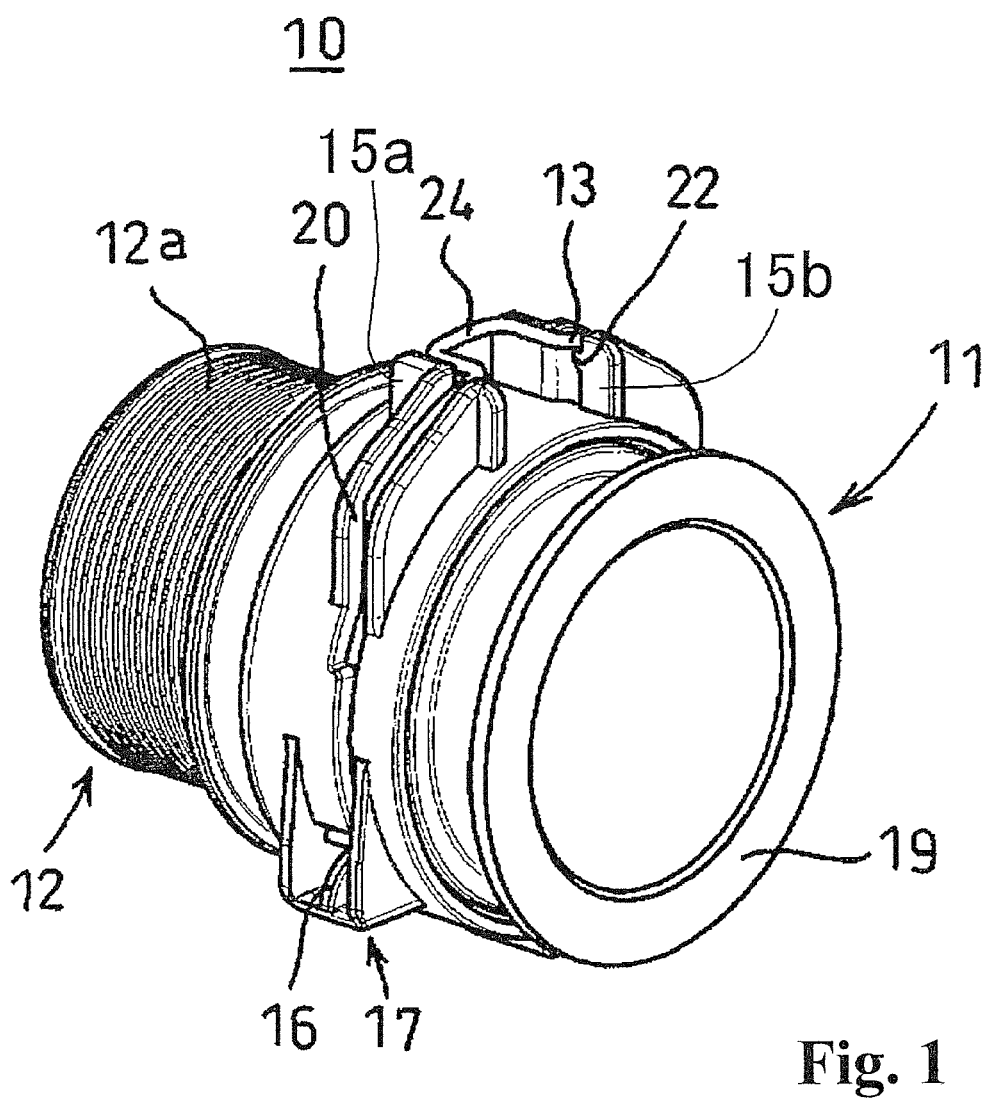
FIG. 1 is a perspective view showing a connection state of a connector showing one embodiment of the present invention.
Figure 2:
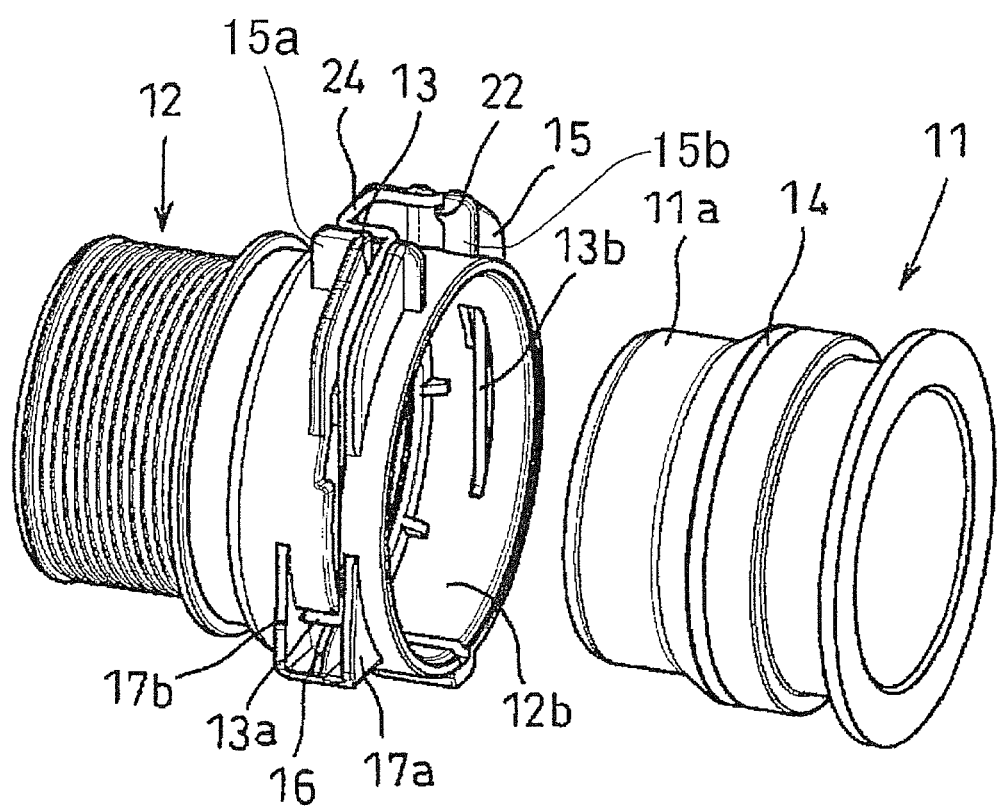
FIG. 2 is a perspective view showing a separated state of the same connector.
Figure 3:
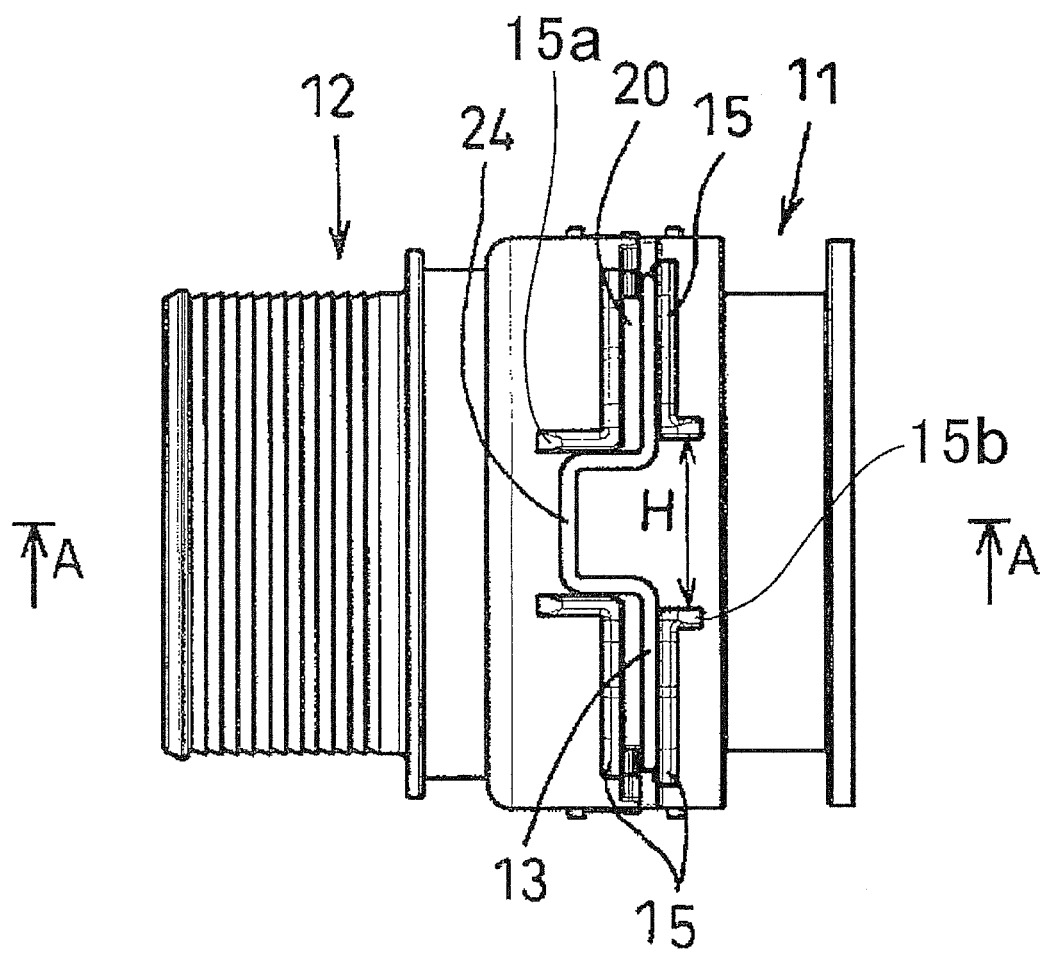
FIG. 3 is a plan view showing the connection state of the same connector.
Figure 4:
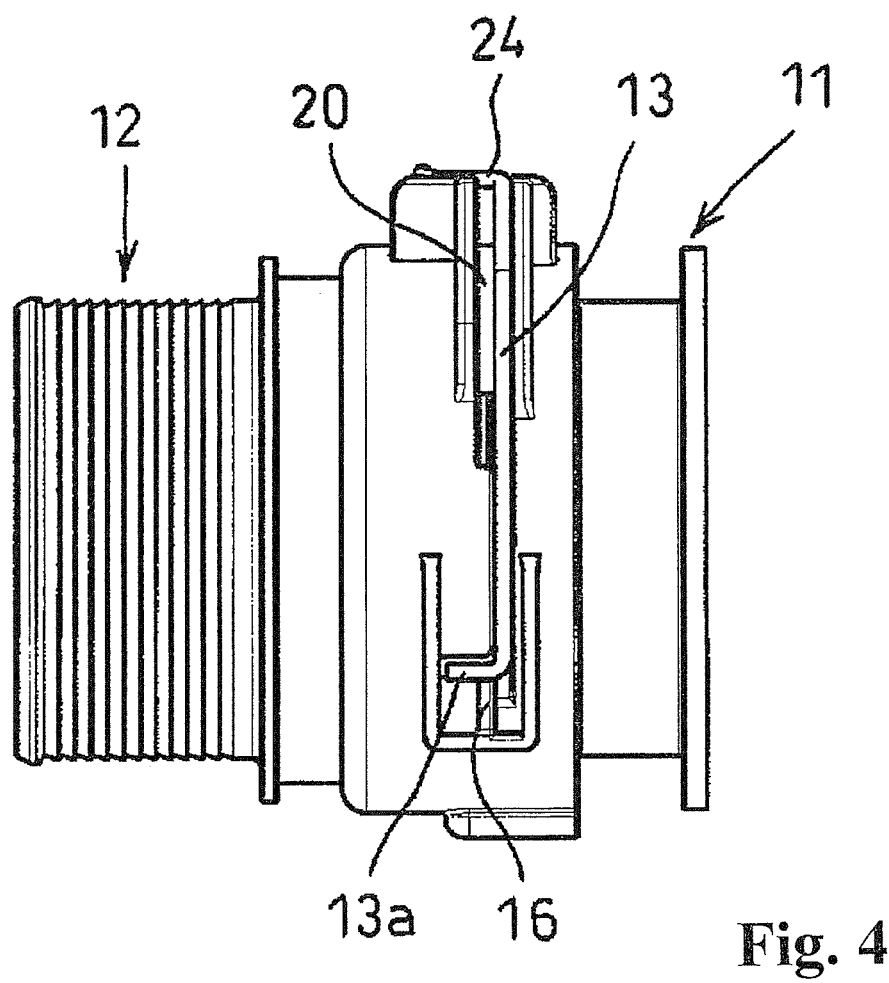
FIG. 4 is a side view showing the connection state of the same connector.

Hereinafter, the present invention will be explained in detail based on the drawings showing one embodiment. FIG. 1 is a perspective view showing a connection state of the connector showing one embodiment of the present invention; FIG. 2 is a perspective view showing a separated state of the connector of the present invention; FIG. 3 is a plan view showing a connection state of the same connector; and FIG. 4 is a side view showing the connection state of the same connector. Here, a connector 10 comprises a cylindrical connector housing 12 in which a hose is connected to one end, and a male member 11 is mounted on the other end; the male member 11 in which the hose is connected to one end, and the other end is mounted on the connector housing 12; and a lock member 13 which can engage and disengage between the connector housing 12 and the male member 11. The male member 11 includes an engagement groove 14 which is an engagement portion with which a leg portion 13b of the lock member 13 engages on an outer periphery. The connector housing 12 includes lock-member guide walls 15 guiding the lock member 13; an engagement projection 22 engaging with one portion of the lock member 13, and restricting the lock member 13 from descending; a U-shaped wall 17 with a nearly U-shaped cross section including a sliding surface 16 where a tip portion 13a slides accompanied by the movement of the lock member 13; and a through-hole 18 through which one portion of the lock member 13 held by the lock-member guide walls 15 passes, and which is formed to engage with the engagement groove 14 which is the engagement portion formed on the outer periphery of the male member 11 mounted on the connector housing 12. Incidentally, the engagement groove 14 may be an engagement step portion.

The male member 11 is formed by, for example, a synthetic resin and the like, has a cylindrical shape, and includes a flange 19 at a base end portion to which the hose is connected, and there is formed the engagement groove 14 on the outer periphery of an approximately intermediate portion.

Also, a tip portion 11a mounted on the connector housing 12 is formed to be tapered, and a diameter of the tip portion 11a is enlarged in a conical shape just before the engagement groove 14.

The connector housing 12 includes a hose connecting portion 12a wherein the hose is connected to one end; and a mounting opening 12b wherein the male member 11 is mounted on the other end. The connector housing 12 is formed by, for example, the synthetic resin and the like. Also, on an outer periphery of the hose connecting portion 12a, there is included a plurality of annular concave and convex portions for preventing a hose from coming off. Also, at an outer peripheral top portion of the mounting opening 12b whose diameter is enlarged, there are formed the lock-member guide walls 15 on the right and left including a hollow H at a center. The lock-member guide wall 15 includes two wall bodies provided in front and back in an axial direction in such a way as to extend in a circumferential direction throughout a predetermined angle range, and between both wall bodies, there is provided a holding groove 20 which can slidably hold the lock member 13 in a restraining state in the axial direction. The holding groove 20 has a width sufficient for a wire diameter size of the lock member 13, and the lock member 13 can deform in a width direction of the holding groove 20, i.e., in the axial direction of the connector housing 12.

Also, on corresponding end portions of both wall bodies of the lock-member guide wall 15 facing respective ends of the hollow H, there are extended axial-directional extension portions 22a and 22b in a direction of separating from each other. Especially, there is provided the axial-directional extension portion 22a of the lock-member guide wall 15, extending from an end portion of the wall body on a side separating from the male member 11 toward the side separating from the male member 11 in such a way so as to become longer than the other extension portion 22b. Such axial-directional extension portions are provided so as to preferably reinforce the lock-member guide wall 15.

Also, there is provided the engagement projection 22 engaging with one portion of the lock member 13 so as to protrude from the end portion of the wall body on the side of the male member 11 of the lock-member guide wall 15 toward the side separating from the male member 11, and restricting the lock member from descending. Namely, the engagement projection 22 is projected at each of locking walls 15b of the lock-member guide wall 15 toward the side separating from the male member 11 at both right-and-left side positions of the hollow H, which is defined by walls or locking walls 15a, 15b. Also, the engagement projection 22 visually protrudes in the axial direction opposing to the axial-directional extension portion 22b on the side of the male member 11 of the lock-member guide wall 15.

Moreover, on the outer periphery of the connector housing 12, there is formed the through-hole 18 through which the leg portion 13b of the lock member 13 held by the lock-member guide wall 15 can pass, and the through-hole 18 engages with the engagement groove 14 formed on the outer periphery of the male member 11 mounted on the connector housing 12.

As shown in FIGS. 1, 5, 6, 10, 11, and the like, the engagement projection 22 is formed to protrude at approximately a right angle from the lock-member guide wall 15 in a direction of a hose connecting portion from a mounting opening 12b side at a portion facing the hollow H at the center of the lock-member guide wall 15 disposed on the right and left of the connector housing 12. Therefore, the locking portion 22b defined by a face on an upper side (outside a radial direction) of the engagement projection 22 can control the lock member 13 urged by its own spring force from descending in an engagement projection 22 direction inside the holding groove 20 of the lock-member guide wall 15. Also, a lower inclined surface 22a of the engagement projection 22 has a gentle slope, so that in a case wherein an operation portion 24 ascends from a lower direction, the lock member 13 naturally bends so as to climb over the engagement projection 22 and ascend. Moreover, a width of the holding groove 20 is larger than a diameter of the lock member 13, so that the lock member 13 can bend in the axial direction of the connector housing 12 inside the holding groove.

Also, on the outer periphery of the connector housing 12, and at symmetrical positions, there are formed the U-shaped walls 17 including the sliding surfaces 16. The U-shaped wall 17 is positioned below the lock-member guide wall 15, and is disposed such that the tip portion 13a of the lock member 13 held by the lock-member guide wall 15 abuts against the sliding surface 16. Also, the U-shaped wall 17 includes a pair of side walls 17a and 17b along a tangential direction of the outer periphery of the connector housing 12, and there is formed the sliding surface 16 between the side walls 17a and 17b. In the present embodiment, as shown in FIGS. 1, 2, and the like, the sliding surface 16 is formed as a curved surface inclined in a direction of separating from the connector housing 12 downward.

At a deep end of the mounting opening 12b of the connector housing 12, there is disposed an O-ring 21 to ensure water-tightness and an air-tightness between the connector housing 12 and the mounted male member 11. Incidentally, a seal member is not limited to the O-ring, and may be another seal member such as a V-ring, an X-ring, or the like.

Figure 7:
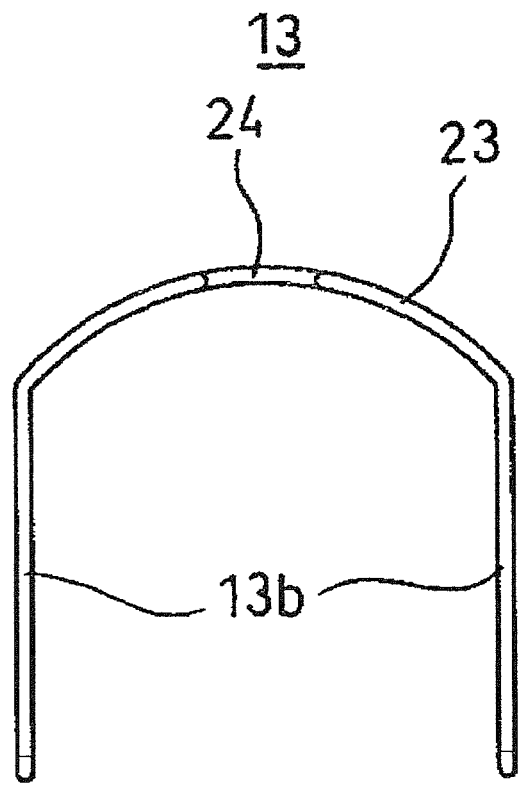
FIG. 7 is a front view of a lock member used for the same connector.
Figure 8:
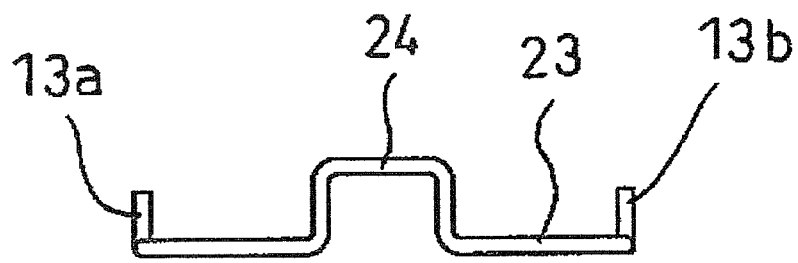
FIG. 8 is a plan view of the same lock member.
Figure 9:
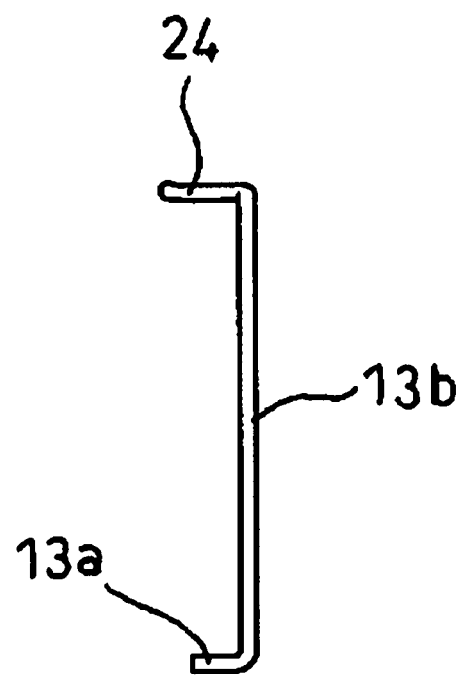
FIG. 9 is a side view of the same lock member.

As shown in FIGS. 7 to 9, the lock member 13 is formed by an elastic wire rod, for example, made of metal formed by bending in such a way as to provide a connection portion 23 curved in a convex shape upward; leg portions 13b linearly extending in parallel to each other respectively from both sides (both sides in the width-direction) of the connection portion 23; and tip portions 13a formed by bending in a direction orthogonal to the leg portions at tips of the leg portions 13b. Also, at a top portion of the connection portion 23, there is formed a U-shaped operation portion 24 bulging in the axial direction of the connector housing 12. Moreover, the operation portion 24 has a size smaller than that of the center hollow H of the lock-member guide wall 15 formed in the connector housing 12, and is housed therein. Moreover, a length in the axial direction and a length in the radial direction of the axial-directional extension portion 22a are determined so that the operation portion 24 is externally surrounded almost completely by the axial-directional extension portion 22a of the lock-member guide wall 15 so as to minimize a projection amount in the radial direction of the portion and prevent a possibility of mistakenly releasing the lock member by mistakenly touching the operation portion 24 or contacting with an external member.

Also, a diameter of the leg portion 13b is smaller than the width of the holding groove 20, so that the leg portion 13b can curve around the leg portion 13b inside the holding groove. Also, the lock member 13 (operation portion 24) housed in the holding groove 20 is always urged in an upper direction and a direction opposite to an arrow B in FIG. 10. Moreover, the diameter of the leg portion 13b is smaller than a width of the through-hole 18, so that the leg portion 13b can pass through the through-hole 18. A length of the leg portion 13b is formed to be longer than a length (height) of the through-hole 18. Incidentally, the lock member 13 may be a plate material made of metal or made of synthetic resin. Namely, the lock member 13 is not limited to the wire rod, and even if the lock member 13 is formed by a long and narrow plate material, the same effect can be obtained.

Figure 5:
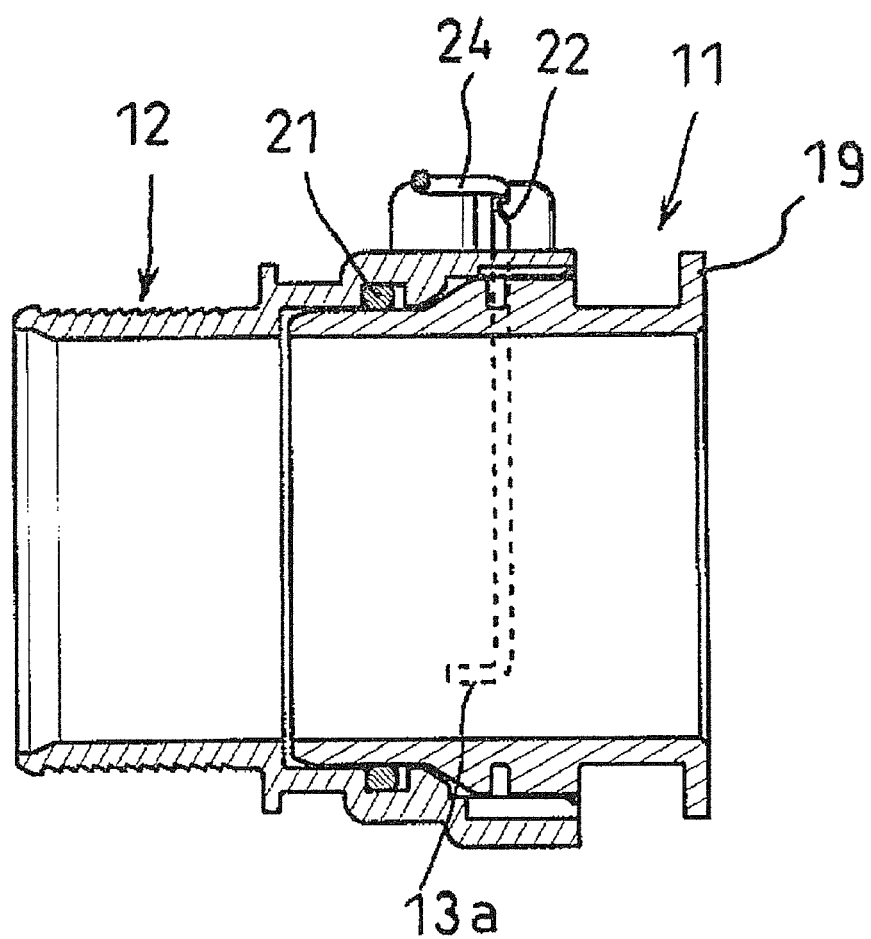
FIG. 5 is a cross-sectional view taken along a line A-A in FIG. 3.
Figure 6:
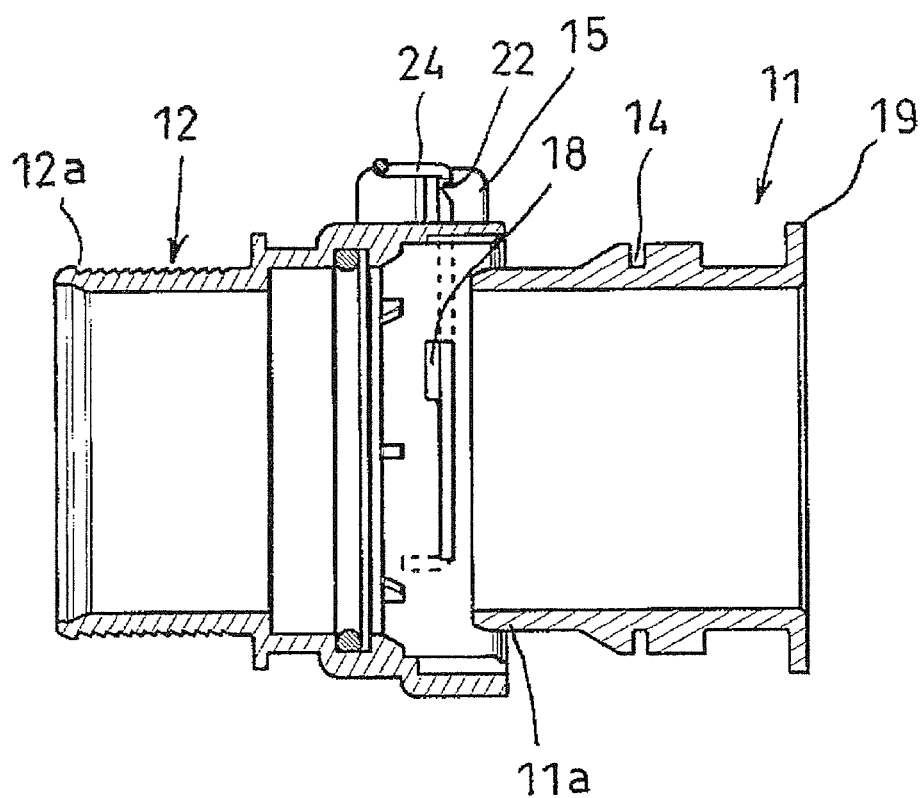
FIG. 6 is a cross-sectional view showing the separated state of the same connector.

In a case of assembling the connector 10 formed as above, at first, the lock member 13 is attached to the connector housing 12 from the upper direction. As for an attachment procedure of the lock member 13, the leg portions 13b are inserted into the holding groove 20 of the lock-member guide walls 15 in such a way as to open the leg portions 13b to the right and left, and are released. Then, the tip portions 13a reach top portions of the sliding surfaces 16 by an elastic force of the wire rod. Also, in the present embodiment, the tip portions 13a of the lock member 13 are attached toward a direction of the hose connecting portion 12a of the connector housing 12. One portion of the attached leg portion 13b protrudes into the mounting opening 12b from the through-hole 18 of the connector housing 12. In that state, as shown in FIGS. 2 and 6, when the male member 11 is mounted from the mounting opening 12b, the tapered tip portion 11a and the portion whose diameter is enlarged in the conical shape just before the engagement groove 14, press and spread the leg portions 13b in an outer peripheral direction, and then, the leg portions 13b engage the engagement groove 14. In a state wherein the leg portions 13b are engaged with the engagement groove 14, as shown in FIG. 5, the O-ring 21 is positioned between an outer periphery of the tip portion 11a of the male member 11 and an inner periphery of the mounting opening 12b of the connector housing 12, and is pressed so as to hold water-tightly or air-tightly.

Figure 10:
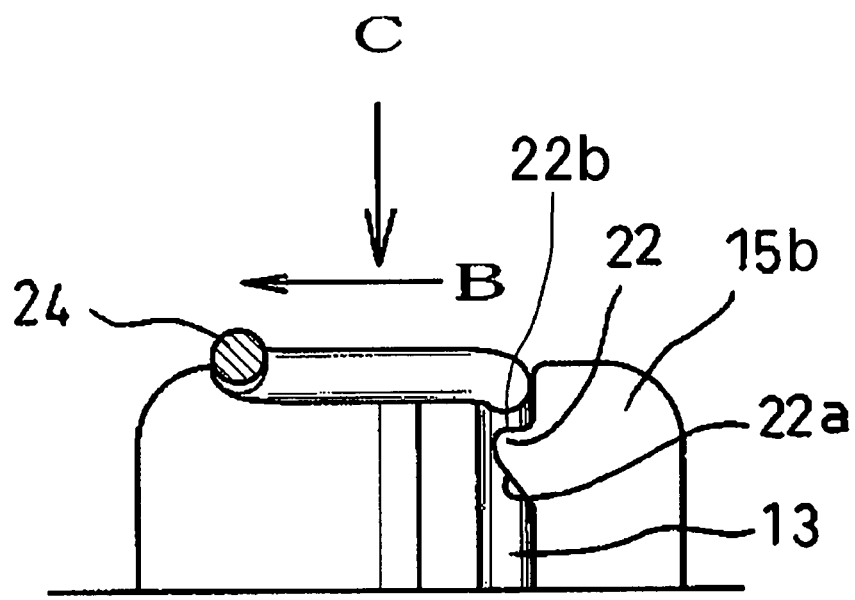
FIG. 10 is an explanatory drawing showing a release procedure of the same lock member.
Figure 11:
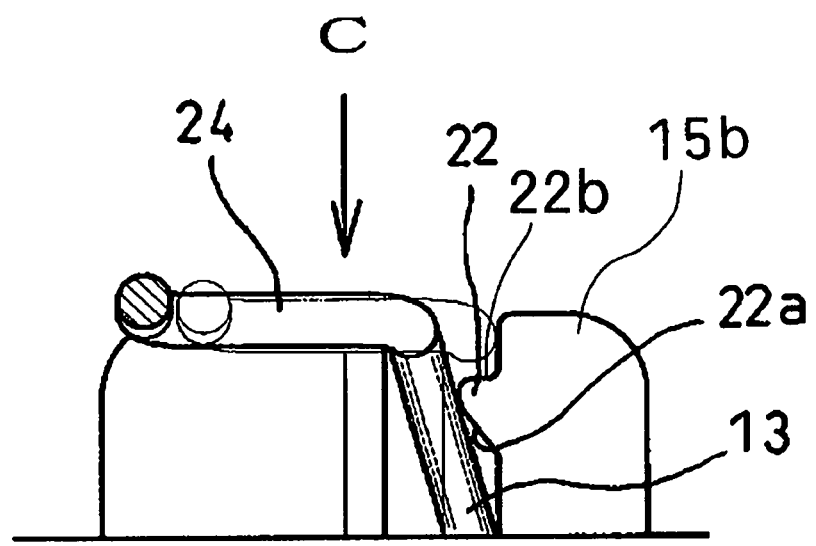
FIG. 11 is an explanatory drawing showing the release procedure of the same lock member.
Figure 12:
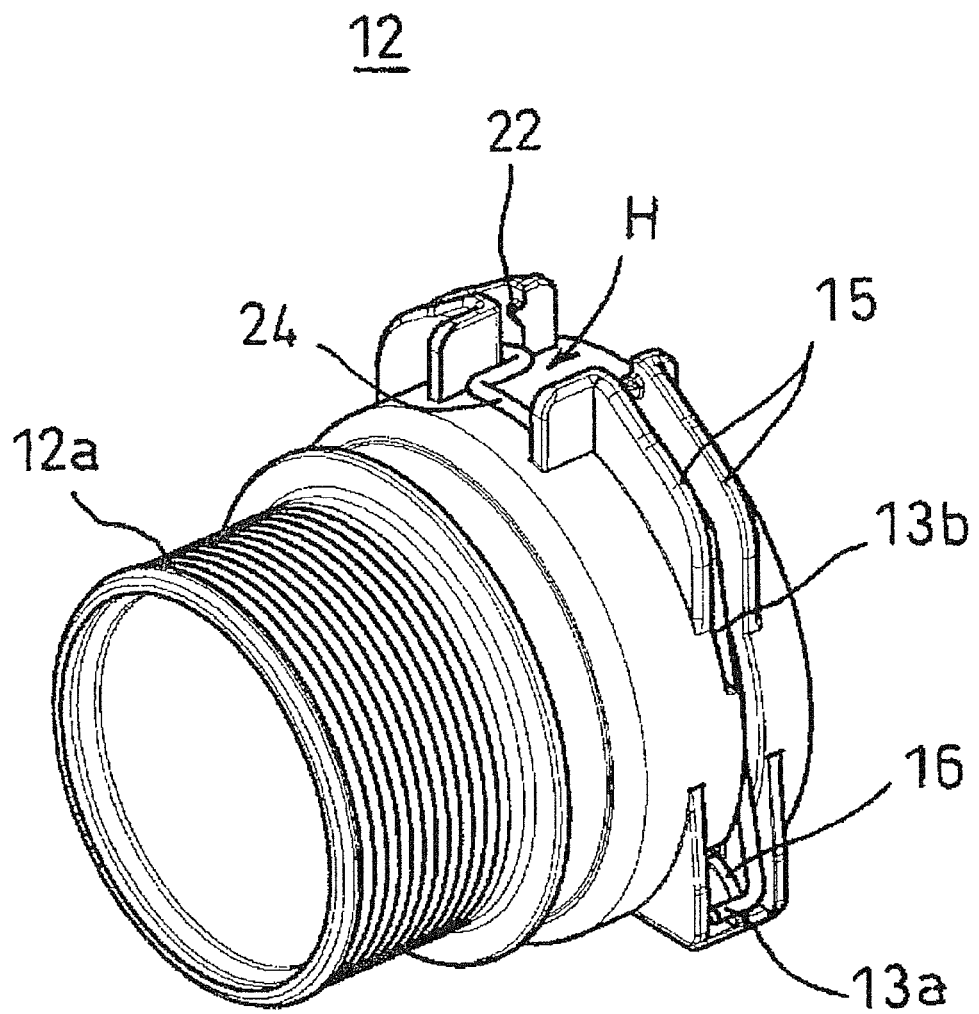
FIG. 12 is a perspective view showing a release state of the same lock member.

In a case wherein an engagement between the male member 11 and the connector housing 12 is released, there is a release method having two steps in that as shown in FIG. 10, at first, the operation portion 24 is moved in an arrow B direction (the axial direction), and after releasing an engagement with the locking portion 22b of the engagement projection 22, as shown in FIG. 11, the operation portion 24 is pushed down in an arrow C direction. The operation portion 24 of the lock member 13 is pressed from above, so that the tip portions 13a descend along the sliding surface 16, and the leg portions 13b spread to open to the right and left. By the spreading of the leg portions 13b, the leg portions 13b are removed from the engagement groove 14 of the male member 11, and the engagement is released so as to pull out the male member 11 (see FIG. 12). Also, the tip portion 13a is surrounded by the side walls 17a and 17b from the front and back in the axial direction of the connector housing 12 so as to prevent a deformation and the like of the tip portion 13a by an unintended external force and to reliably perform a release operation.

Thus, in the present invention, the operation portion 24 of the lock member 13 is not only pressed from above, but after an engagement with the engagement projection 22 is released, a pushing-down operation becomes possible so as to prevent an unprepared release and ensure safety. Also the release operation can be carried out even in a narrow place without a space for projecting.

Also, after the release, when a finger is taken off from the operation portion 24, the operation portion 24 climbs over the lower inclined surface 22a of the engagement projection 22 by its own elastic force to ascend so as to automatically return to a standby state.

Second Embodiment

Figure 13:
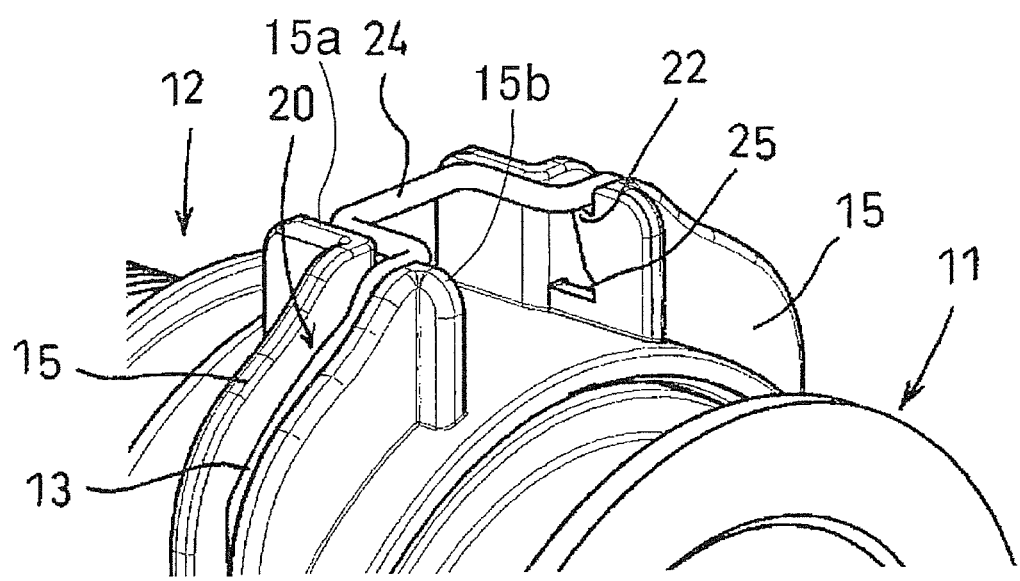
FIG. 13 is a perspective view of essential parts of the connector showing another embodiment of the present invention.
Figure 14:
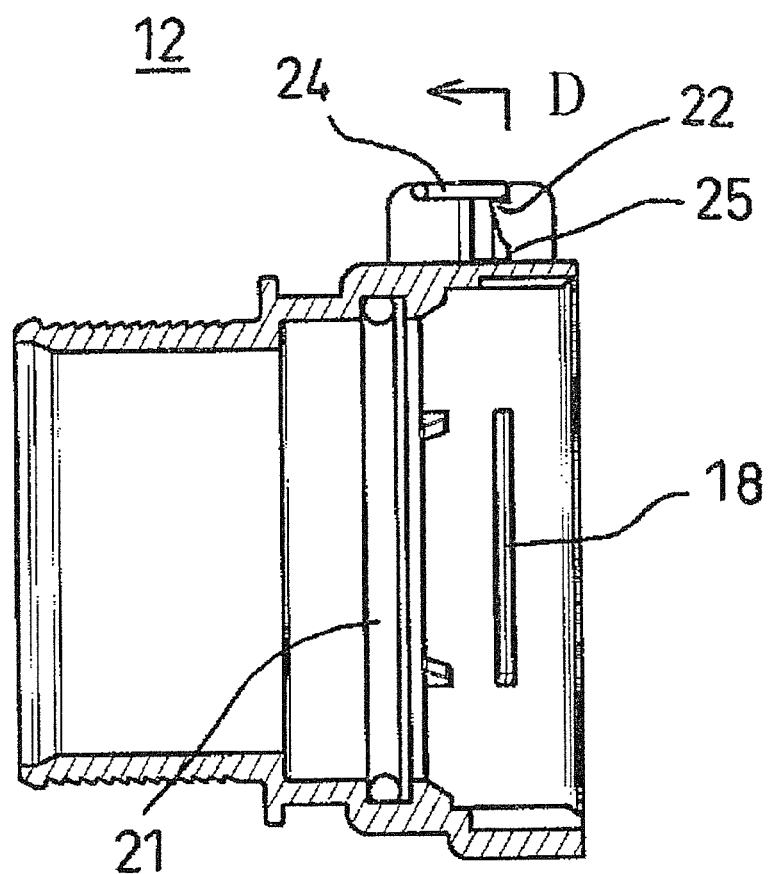
FIG. 14 is a longitudinal cross-sectional view showing a lock standby state of a connector housing used for the same connector.
Figure 15:
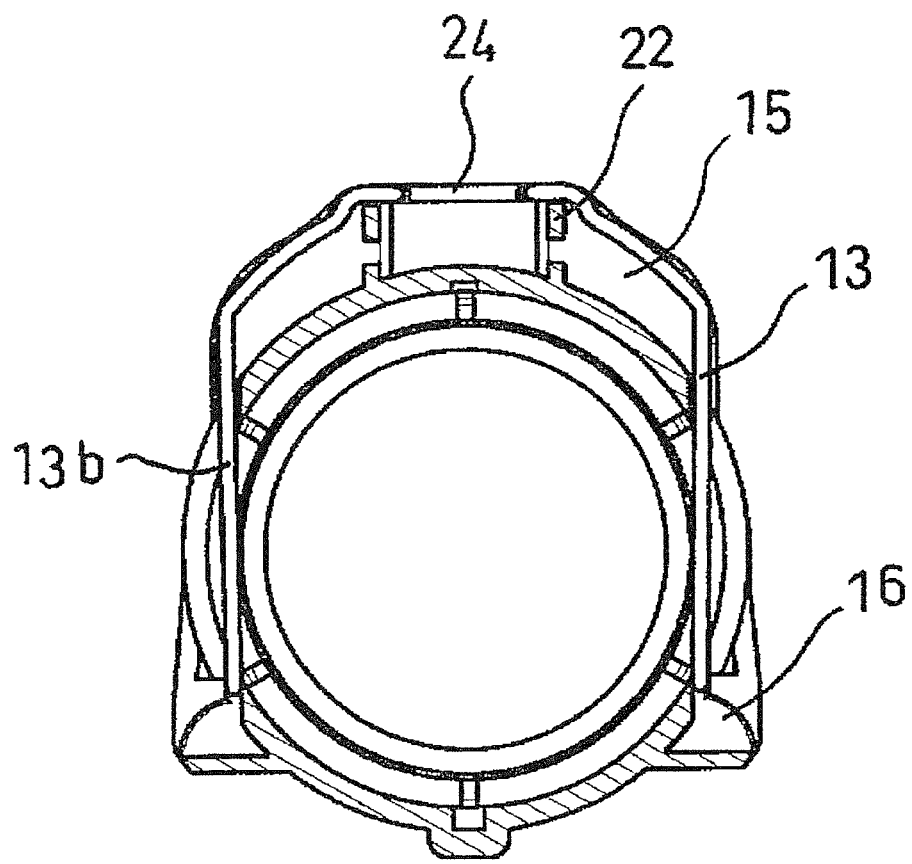
FIG. 15 is a cross-sectional view taken along a line D-D in FIG. 14.

FIG. 13 is a perspective view of essential parts of the connector showing another embodiment of the present invention; FIG. 14 is a longitudinal cross-sectional view showing a lock standby state of a connector housing used for the connector of the present invention; and FIG. 15 is a cross-sectional view taken along a line D-D in FIG. 14. In the present embodiment, the lock-member guide wall 15 comprises a holding portion 25 holding a release state of the lock member 13, and other structures are the same as those in the first embodiment, so that the same symbols are assigned, and their explanations are omitted.

As shown in FIG. 13 and the like, the holding portion 25 is formed at a portion facing the hollow H where the operation portion 24 can be housed at a center top portion of the lock-member guide wall 15. Also, the holding portion 25 is formed as an undercut concave portion with which the lock member 13 positioned below the engagement projection 22 can engage. Therefore, in a case wherein the operation portion 24 of the lock member 13 is pushed down after an engagement of the engagement projection 22 relative to the locking portion 22b is released, one portion of the operation portion 24 (the lock member) engages with the holding portion 25 so as to hold a descending state of the lock member 13. Namely, the engagement between the connector housing 12 and the male member 11 remains to be released.

FIG. 14 is the longitudinal cross-sectional view showing the lock standby state of the connector housing 12, and FIG. 15 is the cross-sectional view taken along the line D-D in FIG. 14. In that state, the lock member 13 is engaged with the engagement projection 22, and the operation portion 24 cannot be pushed down. In order to push down the operation portion 24, as in a case of the first embodiment, it is necessary to release the engagement with the engagement projection 22.

Figure 16:
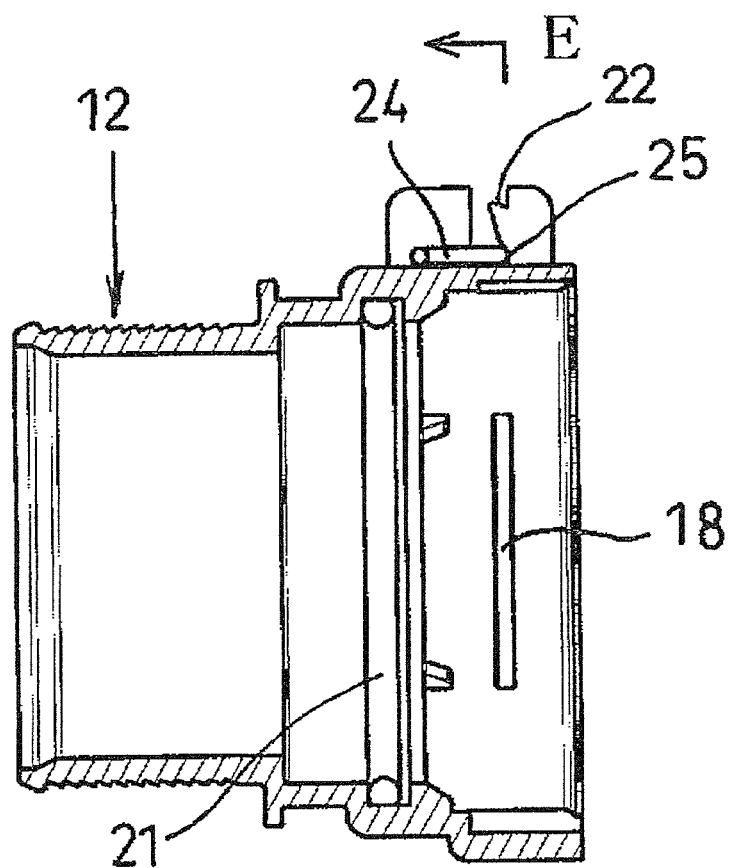
FIG. 16 is a longitudinal cross-sectional view showing a release state of the same connector housing.
Figure 17:
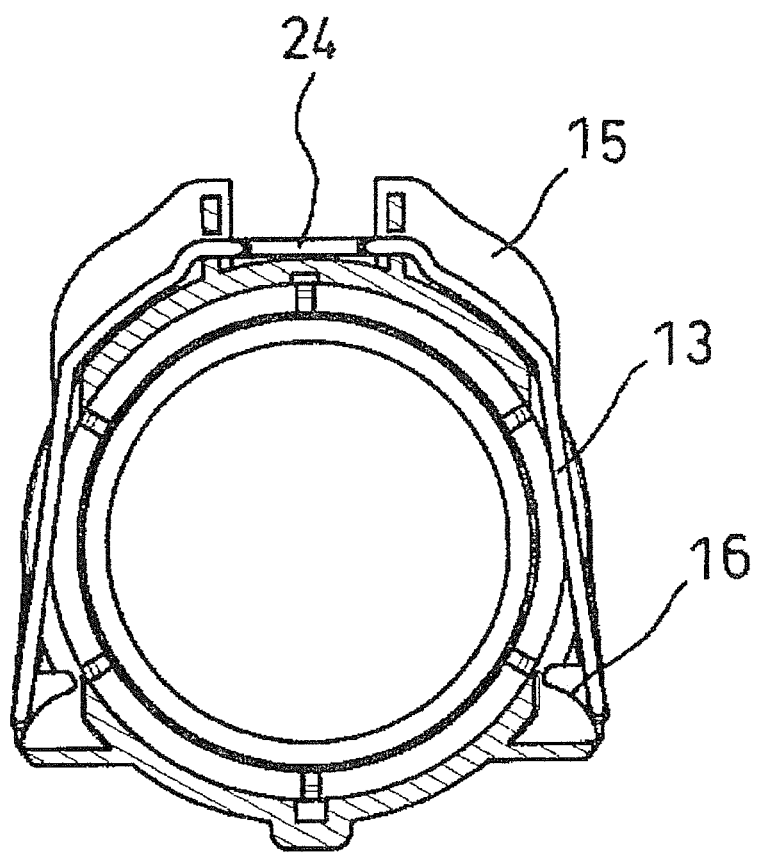
FIG. 17 is a cross-sectional view taken along a line E-E in FIG. 16.
Figure 18:
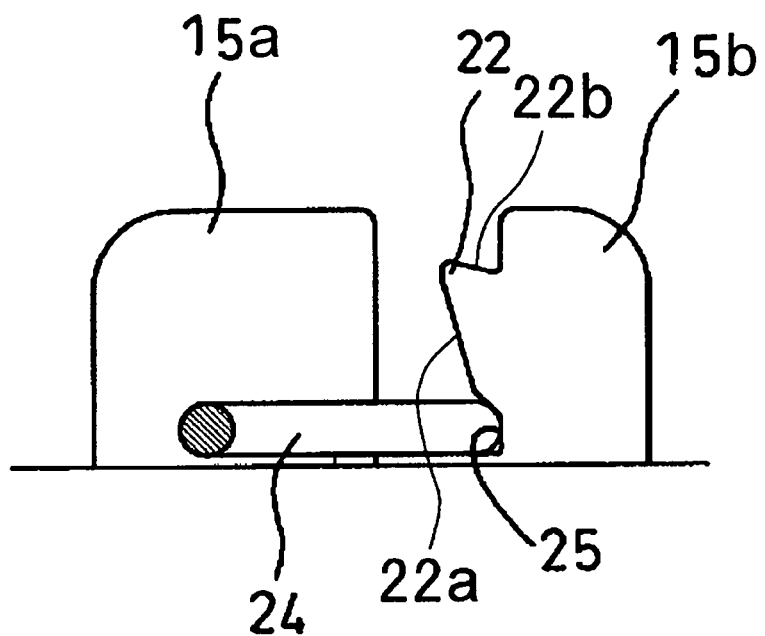
FIG. 18 is an enlarged view of essential parts showing a lock release state of the same lock member.

FIG. 16 is a longitudinal cross-sectional view showing a release state of the connector housing 12; FIG. 17 is a cross-sectional view taken along a line E-E in FIG. 16; and FIG. 18 is an enlarged view of essential parts showing a lock release state of the same lock member. The lock member 13 is held in the holding portion 25, and is held in a state wherein the operation portion 24 is pushed down. Consequently, the connector is held in the lock release state, and the male member 11 to which the hose is connected can be pulled out.

Thus, in the connector 10 of the present invention, even in a narrow space, the operation can be easily carried out, and the release state of the lock member 13 can be maintained, so that it is not necessary to pull out a heavy hose while pressing the operation portion 24 with one hand, and the hose can be held and pulled out with both hands. Therefore, workability for releasing the connector can be improved. Also, there is no portion which projects, so that in a case of being removed, there is no risk of scratching another part as well. Also, in a case wherein the lock member 13 is returned to the lock standby state, if an engagement with the holding portion 25 is released by a tip of a minus driver and the like, the operation portion 24 ascends along the lower inclined surface 22a by its own elastic force to return.

Incidentally, an example in which a shape of the sliding surface 16 is the convex curved surface in the upper direction has been explained; however, the shape may have a flat surface and a curved surface concaved in the upper direction, or a shape wherein a curvature of the curved surface changes.

The connector of the present invention can be used for a water system pipe of a radiator of construction machinery, a battery pack, and the like, or for an air system pipe of an intercooler and the like as the connector for a large diameter pipe.

EXPLANATION OF SYMBOLS 10 a connector
11 a male member
11a a tip portion
12 a connector housing
12a a hose connecting portion
12b a mounting opening
13 a lock member
13a a tip portion
13b a leg portion
14 an engagement groove (engagement portion)
15 a lock-member guide wall
15a and 15b walls or locking walls
16 a sliding surface
17 a U-shaped wall
17a and 17b side walls
18 a through-hole
19 a flange
20 a holding groove
21 an O-ring
22 an engagement projection
22a a lower inclined surface
22b a locking portion
23 a connection portion
24 an operation portion
25 a holding portion

What is claimed is:

1. A connector, comprising:
a cylindrical connector housing having through-holes extending in a circumferential direction and formed on right and left;
a cylindrical male member including an opposing end to be entered into an opposing end of the connector housing, and a circumferential groove conforming with the through-holes in a state wherein the male member enters into the opposing end of the connector housing; and
an elastic lock member including an intermediate portion, and right-and-left leg portions extending to right and left from the intermediate portion to be received into the through-holes,
wherein the connector housing includes sliding inclined surfaces to be engaged with loose ends of the leg portions of the lock member provided on an outer periphery of the connector housing,
the lock member takes an engagement position where the loose ends of the leg portions are positioned in proximal positions of the sliding inclined surfaces, and the leg portions enter into the circumferential grooves inward from the through-holes; and a release position where the loose ends of the leg portions are positioned in distal positions of the sliding inclined surfaces, and respectively spread to open the leg portions against an elastic force of the lock member, and the leg portions escape toward the through-holes from the circumferential groove, and
the connector housing further includes a locking wall standing on an outer periphery of an upper portion of the connector housing, an engagement projection projecting laterally outwardly from the locking wall along an axial direction of the connector housing, and a locking portion located on an upper surface of the engagement projection, the locking portion locking the lock member in the locking position.

2. A connector according to claim 1, wherein the lock member is displaced in the axial direction so as to engage and disengage the lock member relative to the locking portion.

3. A connector according to claim 1, wherein the outer periphery of the connector housing includes a lock-member guide wall controlling an axial direction displacement of the lock member in such a way as to extend in the circumferential direction, and the locking wall is integrally provided with the lock-member guide wall.

4. A connector according to claim 1, wherein the locking wall forms an axial-directional extension portion of the lock-member guide wall.

5. A connector according to claim 1, wherein the locking wall includes a holding portion holding a release state of the lock member under the locking projection.

6. A connector according to claim 5, wherein the holding portion includes an undercut concave portion provided below the engagement projection of the locking wall.

7. A connector according to claim 3, wherein the intermediate portion of the lock member includes a portion bent in such a way as to project in the axial direction, the lock-member guide wall includes a hollow portion to receive the bent portion, and axial-directional extension portions to externally surround the bent portion from a right-and-left direction.

8. A connector according to claim 1, wherein the lock member is formed by a metal wire rod having elasticity.

9. A connector according to claim 1, wherein each of the leg portions of the lock member includes a portion bent in the axial direction.

10. A connector according to claim 1, wherein the outer periphery of the connector housing includes inclined walls projecting from the outer periphery and defining the sliding inclined surfaces, and side walls connecting side portions of the inclined walls to the outer periphery.

11. A connector according to claim 1, wherein the sliding inclined surface has a curved surface.

12. A connector according to claim 1, wherein the engagement projection includes two projections spaced apart from each other to form a space therebetween and extending in the axial direction, each projection having the locking portion on the upper surface thereof.

13. A connector according to claim 12, wherein the projection includes an upward extension portion and a lateral extension portion shorter than the upward extension portion.

* * * * *